United States Patent [19]
Frazee

[11] 3,962,930
[45] June 15, 1976

[54] SYNCHRONIZED MANUALLY CONTROLLED MULTIPLE SPEED RATIO TRANSMISSION

[75] Inventor: William T. Frazee, Plymouth, Mich.
[73] Assignee: Ford Motor Company, Dearborn, Mich.
[22] Filed: Dec. 16, 1974
[21] Appl. No.: 533,370

[52] U.S. Cl. .............................. 74/473 R; 74/337.5; 74/477
[51] Int. Cl.² .......................................... G05G 9/12
[58] Field of Search ............... 74/335, 337.5, 473 R, 74/701, 477, 471 XY

[56] References Cited
UNITED STATES PATENTS

| | | | |
|---|---|---|---|
| 2,312,975 | 3/1943 | Peterson et al. | 74/473 |
| 2,569,341 | 9/1951 | Schjolin | 74/473 X |
| 3,264,893 | 8/1966 | Stott et al. | 74/477 |
| 3,302,740 | 2/1967 | Giacosa | 180/70 R X |
| 3,550,467 | 12/1970 | Forichon | 74/473 |
| 3,916,718 | 11/1975 | Kelbel et al. | 74/473 R X |

FOREIGN PATENTS OR APPLICATIONS

| | | | |
|---|---|---|---|
| 1,053,353 | 12/1966 | United Kingdom | 74/473 |

Primary Examiner—Samuel Scott
Assistant Examiner—Lance W. Chandler
Attorney, Agent, or Firm—Donald J. Harrington; Keith L. Zerschling

[57] ABSTRACT

A multiple ratio power transmission mechanism for an automotive vehicle adapted for mounting in transverse disposition with respect to the fore and aft centerline of the vehicle and comprising a torque input shaft with torque input gearing adapted to be clutched to the crankshaft of the engine and countershaft gearing meshing with the torque input gearing, synchronizer clutches associated with the gearing, a geared differential establishing a driving connection between the countershaft and each of two drive wheel axle shafts, a single shift fork rail adapted for axial and rotary movement to effect engagement and release of the synchronizer clutches, a shift selector control shaft situated in transverse disposition with respect to the axis of the shift rail and a right-angle drive lever mechanism for connecting driveably the shift selector control shaft with the shift fork rail to effect transfer of rotary and axial movement to the shift rail and to cause corresponding movement of the shift rail for speed ratio changes.

2 Claims, 13 Drawing Figures

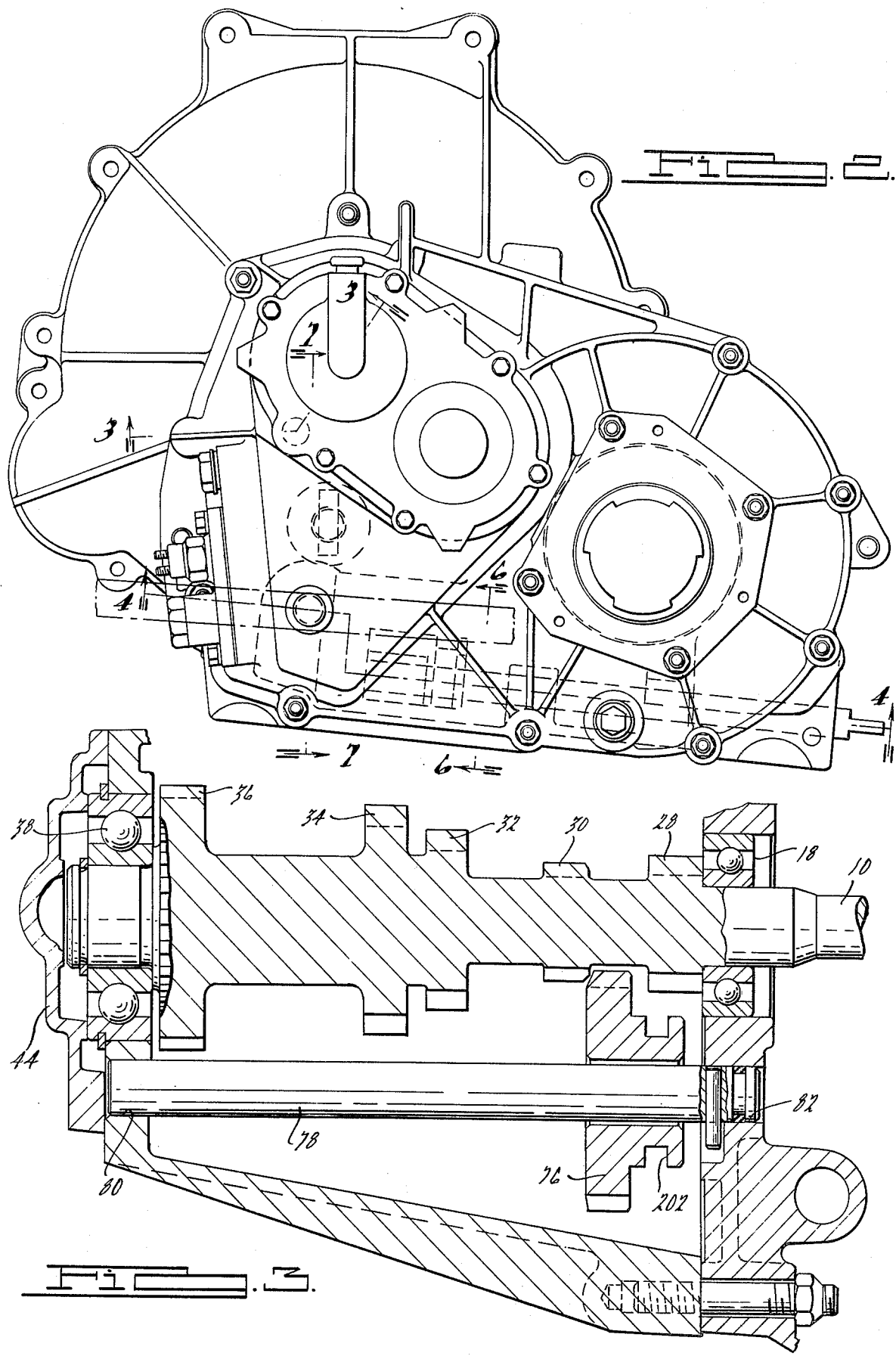

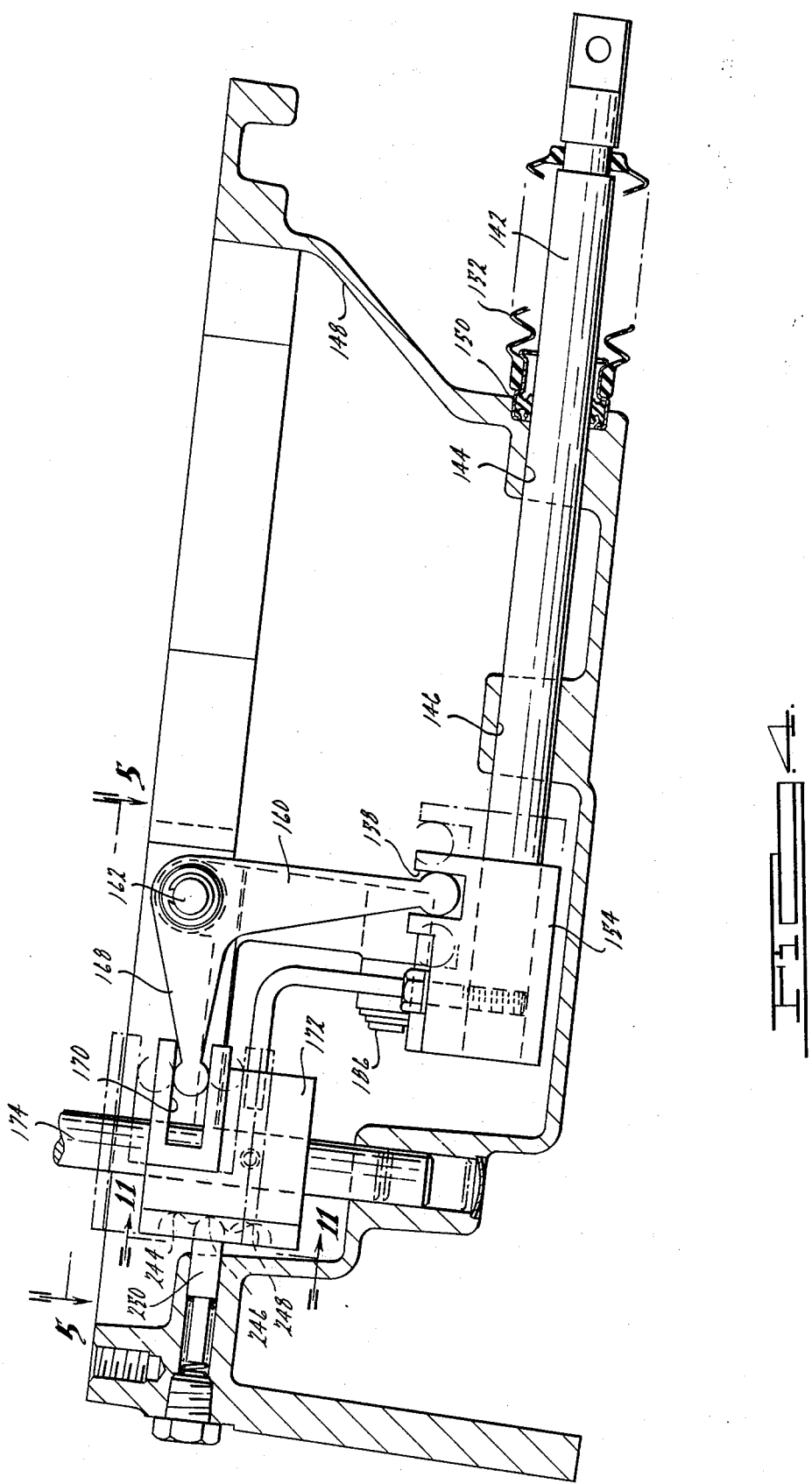

SYNCHRONIZED MANUALLY CONTROLLED MULTIPLE SPEED RATIO TRANSMISSION

BRIEF DESCRIPTION OF THE INVENTION

My invention relates generally to automotive vehicle drivelines and especially to a transaxle transmission mechanism in combination with an internal combustion engine wherein a common axis for the engine and for the transmission is transversely disposed with respect to the fore-and-aft axis of the vehicle. It is an improvement in drivelines of the types shown in U.S. Pat. Nos. 3,302,740, 2,782,864, 2,420,581 and in Australian Pat. No. 249,696.

Although the gearing portions of the transmission mechanism of the improved driveline of this disclosure bear some similarity to gearing arrangements shown in prior art references, including the patents mentioned in the preceding paragraph, my invention is characterized by an improved shift linkage mechanism which has a minimum number of parts and which may be manufactured at less cost relative to shift mechanisms of known constructions. The torque transmitting elements of the shift linkage mechanism of this disclosure also are arranged with a minimum space requirement thereby making it simpler to package the driveline in the engine compartment of a vehicle.

The shift mechanism of my invention also makes it possible to arrange the transmission gear shifting forks for movement on an axis that is transversely disposed with respect to the axis of the driver controlled shift selector control shaft. Unlike known shifting mechanisms, my invention is characterized also by a simplified lever assembly for controlling engagement and disengagement of a reverse idler pinion in the gearing. This is accomplished by use of a direct acting shift fork mounted for movement along the axis of the shift rail for the other shift forks for the gearing.

The housings for the transmission and the engine are joined together to form a common assembly. A driver controlled friction clutch establishes a driving connection selectively between the input shaft of the transmission and the engine crankshaft. Synchronizer clutches are mounted on a transmission countershaft in parallel disposition with respect to the transmission input shaft. The synchronizer clutches in turn are controlled by the aforementioned shift forks.

The power output drive gearing for the transmission mechanism comprises a pinion connected to the transmission countershaft and a larger ring gear for the differential mechanism. The output gears for the differential mechanism are arranged for rotation about an axis parallel to the driveshaft and the countershaft.

My driveline is adapted particularly for an independent drivewheel suspension. For this reason the output gears for the differential are coupled to the inboard ends of independent driveshafts for the traction wheels, suitable universal joint connections being provided for this purpose.

A driver controlled shift lever is used to effect angular and axial movements of a selector shaft. A first bellcrank connection is provided between the selector shaft and the shift rail for the shifter forks to translate axial movement of the selector shaft into axial movement of the shift rail. Another bellcrank connection is provided to translate rotary motion of the selector shaft into rotary motion of the shift rail. The shift rail and selector shaft are located in right angle disposition, one with respect to the other. Each shift fork has a hub supported on the shift rail. Each hub is provided with a fork extension located adjacent a selector finger carried by the shift rail. An interlock plate cooperates with the selector finger so that when a mechanical connection is established between the selector finger and the appropriate shift fork, the interlock plate registers with the other two forks so that movement thereof is prevented. This shift fork selector and the interlock, as well as the functionally inter-related shift lever and shift rail, cooperate to define a simplified gearshift control with reduced space requirements. It is characterized also by simplified assembly procedures and lower manufacturing costs.

BRIEF DESCRIPTION OF THE FIGURES OF THE DRAWINGS

FIG. 2 is a side view of the transmission assembly shown in FIG. 1;

FIG. 3 is a cross sectional view taken along the plane of section line 3—3 of FIG. 2;

FIG. 4 is a cross sectional view taken along the plane of section line 4—4 of FIG. 2;

PARTICULAR DESCRIPTION OF THE INVENTION

Figure 1:
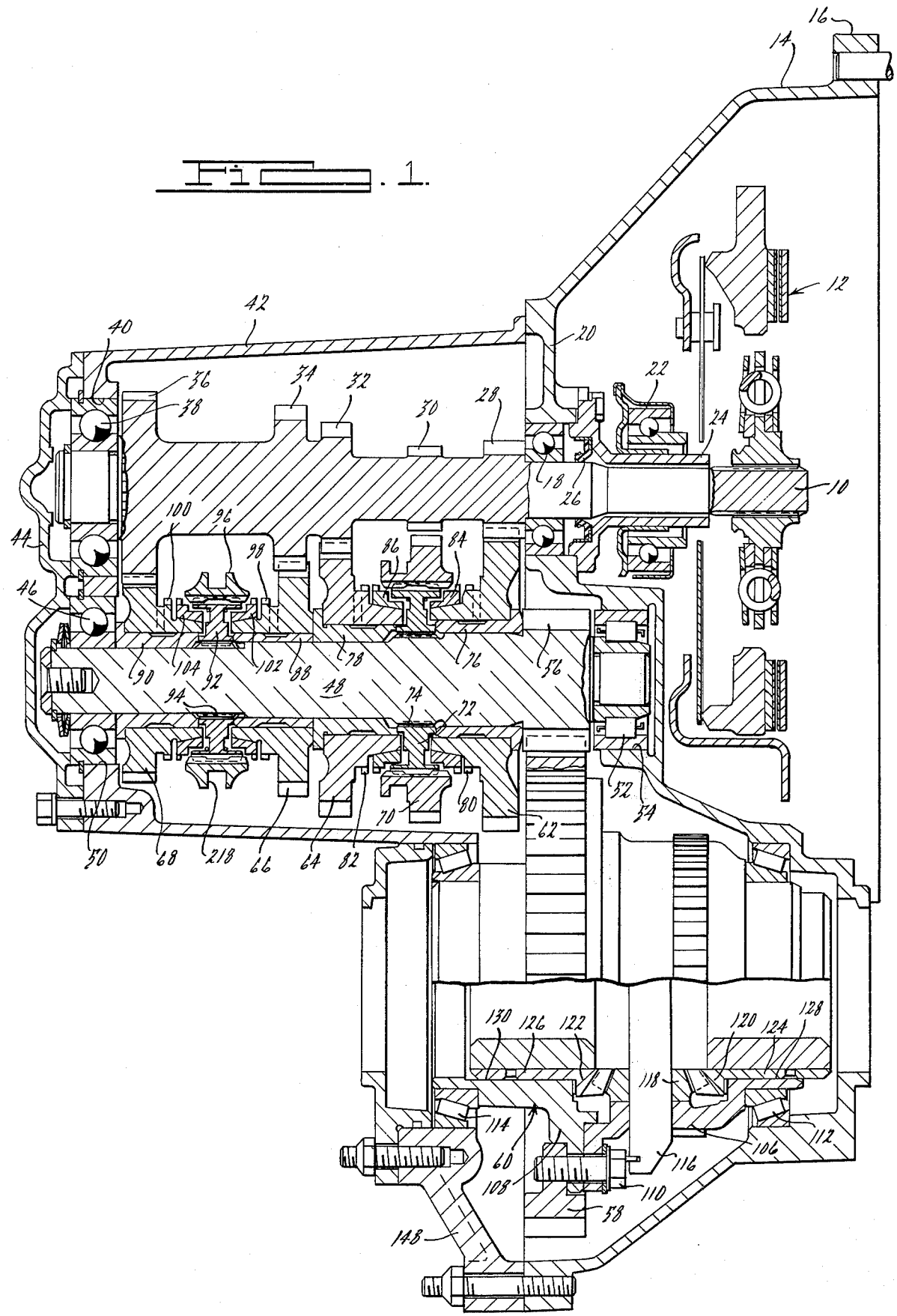
FIG. 1 is a cross sectional view of the transmission gearing arrangement for my invention.

Numeral 10 designates generally a power input shaft for the transmission gearing. A driver controlled friction clutch, shown generally at 12, establishes selectively a driving connection between the crankshaft of an internal combustion engine, not shown, and the shaft 10. The engine provides a support for clutch housing 14, the latter being bolted to the engine by suitable bolts located at the peripheral margin 16 of the housing 14.

Input shaft 10 is journalled by bearing 18 in a bearing opening formed in support wall 20 of the housing 14. A clutch throw-out bearing 22, which is slidably supported on sleeve shaft 24, controls the engagement and release of the clutch 12. A shaft seal 26 is carried by one end of the sleeve shaft 24 to provide a seal around the shaft 10.

Formed on or carried by shaft 10 are five torque input gears, shown respectively at 28, 30, 32, 34, 36. These form a torque delivery path during operation in low speed ratio, reverse, second speed ratio, third speed ratio and fourth speed ratio, respectively. The left-hand end of the shaft 10 is journalled by bearing 38 in bearing opening 40 formed in the end wall of housing 42 for the gearing. The right-hand end of the housing 42, as indicated in FIG. 1, is bolted to the left-hand end face of the clutch housing 14.

An end cover plate 44 bolted to the left-hand of the housing 42 covers the bearing 38 as well as bearing 46 for countershaft 48. The left-hand end of the countershaft 48 is journalled in the bearing 46, the latter being received in bearing opening 50 formed in the left-hand end wall of the housing 42.

The right-hand end of countershaft 48 is journalled by bearing 52 located in a bearing opening 54 formed in the left-hand wall of the housing 14. A torque output gear 56 is fixed to the countershaft 48. It meshes with a large output gear 58 which serves as the drive gear for a differential gear assembly designated generally by reference character 60.

The countershaft 48 rotatably supports output gears 62, 64, 66 and 68 which form, respectively, a part of the torque delivery paths for low speed ratio drive, second speed ratio drive, third speed ratio drive and fourth speed ratio drive. Reverse gear 70 is carried by reverse gear hub 72, which in turn is splined at 74 to the countershaft 48. Gear 70 is splined to the periphery of the hub 72 and adapted for axial sliding movement on the hub. A reverse drive pinion, best seen at 76 in FIG. 3, is adapted to engage the gear 70. Pinion 76 may be moved axially on a reverse pinion support shaft 78 on which it is journalled. The shaft 78 is end supported in openings 80 and 82 formed respectively in the left end of housing 42 and the left end of the housing 14.

The bearing for gear 62 is a sleeve bearing, as shown at 76. A similar sleeve bearing 78 supports the gear 64. The gear 70 which forms a part of the reverse torque delivery path has internal clutch teeth that are adapted to engage external clutch teeth 80 and 82 formed respectively on the hubs of gears 62 and 64. Synchronizer clutch rings 84 and 86 are disposed respectively between the hub 72 and the gears 62 and 64. The synchronizer rings act in the usual way to establish synchronism in the rotary motion of the clutch teeth for gear 70 and the external clutch teeth for gear 62 or gear 64, depending upon which direction the gear 70 is shifted.

When the gear 70 is in its central position, which is indicated in FIG. 1, and when the reverse pinion 76 is shifted in a left-hand direction as viewed in FIG. 3, pinion 76 is brought into engagement with gear 30 and with gear 70 thereby completing a reverse torque delivery path between shaft 10 and output gear 58. In operation of the transmission in any ratio except reverse ratio, the pinion 76 assumed the position shown in FIG. 3 where it is disengaged from the gear 30. If the gear 70 is shifted in a left-hand direction, clutch teeth 82 of the gear 64 become engaged with the internal clutch teeth of the gear 70 thereby establishing a driving connection between the shaft 48 and the gear 64. Synchronizer clutch ring 86 establishes synchronism prior to clutching engagement.

Gear 66 is journalled on countershaft 48 by sleeve bushing 88 and fourth speed ratio gear 68 is journalled on countershaft 48 by sleeve bushing 90. Synchronizer clutch hub 92 is splined at 94 to the countershaft 48. It is provided with external splines on which internally splined synchronizer clutch sleeve 96 is supported. Sleeve 96 is formed with internal clutch teeth that are adapted to engage external clutch teeth 98 and 100 formed on the hubs of gears 66 and 68, respectively. Conventional synchronizer clutch rings 102 and 104 are provided between the hub 92 and the gears 66 and 68 respectively.

To condition the mechanism for first speed ratio operation, the reverse pinion 76 is adjusted to the position shown in FIG. 3 and the gear 70 is moved to establish clutching engagement between the shaft 48 and the gear 62. The torque delivery path is defined by the clutch 12, shaft 10, gears 28 and 62 and gears 56 and 58.

To establish second speed ratio operation, gear 70 is shifted to the left thereby driveably connecting gear 64 and countershaft 48. The torque delivery path from the engine to the axle shafts then is defined by clutch 12, shaft 10, gears 32 and 64, and gears 56 and 58.

To establish third speed ratio operation the gear 70 is shifted to the neutral position shown in FIG. 1. Clutch sleeve 96 then is shifted in a right-hand direction thereby locking gear 66 to the countershaft 48. The torque delivery path then is defined by clutch 12, shaft 10, gears 34 and 66, countershaft 48 and gears 56 and 58.

Fourth speed ratio operation is achieved by moving the clutch sleeve 96 to its left-hand position thereby establishing a driving connection between countershaft 48 and gear 68. The torque delivery path then is defined by clutch 12, shaft 10, gears 36 and 68, countershaft 48 and gears 56 and 58.

The differential gearing 60 comprises a differential housing formed in two parts as shown at 106 and 108. These housing parts are joined together on the peripheries by bolts 110. Gear 58 is carried by the periphery of the housing, the latter being journalled by roller thrust bearings 112 and 114. A differential pinion shaft 116 extends transversely through the housing portion 106 and it journals thereon a pair of bevel pinions 118. Pinions 118 engage side gears 120 and 122 formed respectively on the inboard ends of universal joint drive sleeve 124 and 126. Sleeve 124 is journalled rotatably in opening 128 formed on one side of the housing portion 106, and a corresponding opening for drive sleeve 126 is formed in one side of the housing portion 108.

Figure 13:
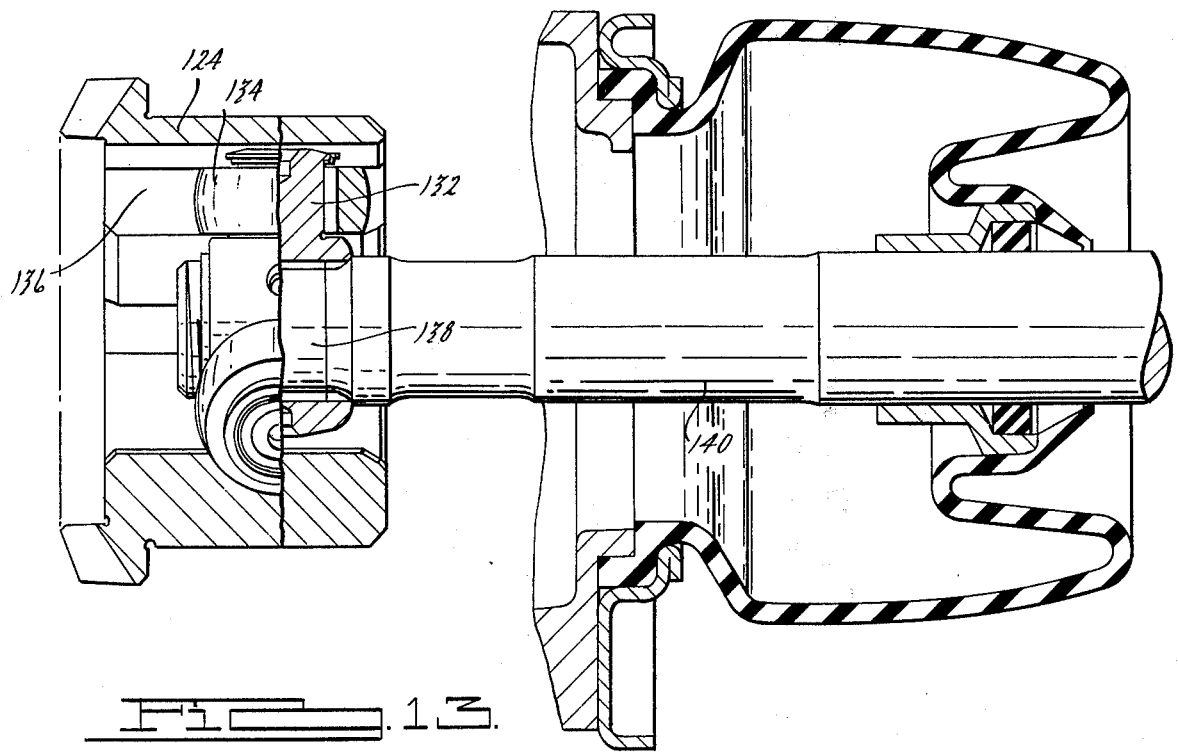
FIG. 13 shows a subassembly view of one end of an axle shaft arranged in cooperation with the side gear of the differential mechanism used with the construction of FIG. 1.

A universal joint member is shown in FIG. 13. It includes radial projections 132 on each of which is journalled a drive roller 134. These engage roller bearing surfaces 136 formed in the interior of drive sleeve 124. Thus the roller bearing surfaces, the sleeve and the gear 120 form an integral one piece assembly. Radial projections 132 extend from an internally splined hub which are splined at 138 to the inboard ends of axle shafts 140. Preferably three rollers 134 are used at each side of the differential assembly.

Figure 5:
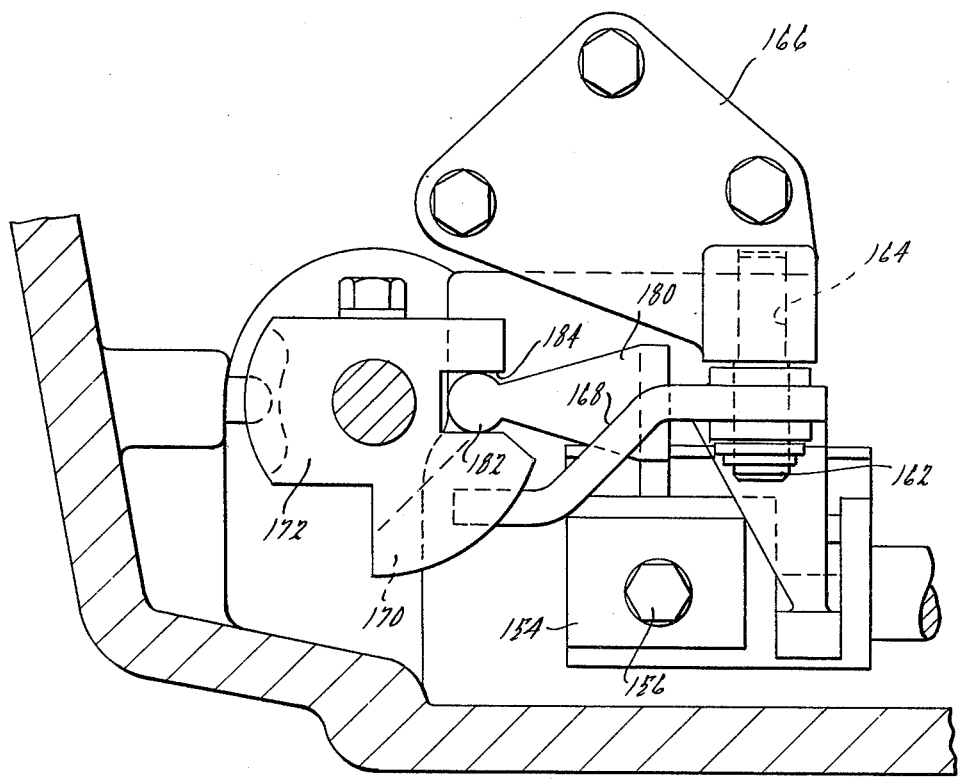
FIG. 5 is a cross sectional view taken along the plane of section line 5—5 of FIG. 4.

In FIG. 4 I have shown in part the shift lever construction for controlling the motion of the synchronizer clutches illustrated in FIG. 1. The shift lever construction includes a main shift selector shaft 142. This is slidably positioned in openings 144 and 146 formed in the housing portion 148 which is bolted as indicated in FIG. 1 to the left-hand side of the housing 14. The opening 144 is provided with a fluid seal 150 and a protective flexible boot 152 at the end of the shift selector shaft 142. Selector block 154 is secured to the inboard end of the shaft 142. This is indicated in FIG. 5 as well as in FIG. 4. The selector block is secured fast to the shaft 142 by locking bolt 156. Selector block 154 is provided with a slot 158 within which is positioned to the rounded end of a bellcrank lever 160. Pivot shaft 162, which is journalled in opening 164 formed in stationary bracket 166, accommodates oscillation of the bellcrank 160. The bellcrank 160 includes also a second arm 168 having a rounded end received within slot 170 formed in selector block 172. Thus when the shift lever 142 moves in an axial direction, bellcrank lever 160 and 168 oscillates about the axis of pivot shaft 162 thereby causing longitudinal adjusting movement of the selector block 172. This block is secured fast to shift rail 174 which is situated at a right angle with respect to the shift lever 142.

Figure 6:
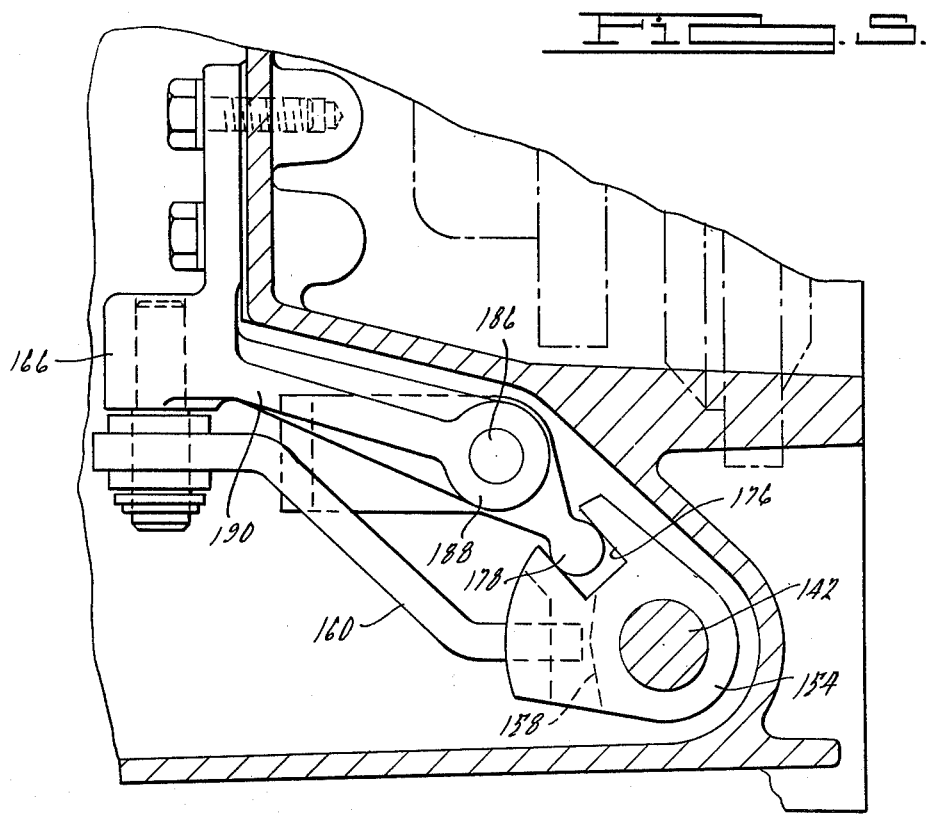
FIG. 6 is a cross sectional view taken along the plane of section line 6—6 of FIG. 2.

Selector block 154 is formed also with slot 176 which receives one end 178 of another bellcrank lever 180. Lever 180 is best seen by referring to FIG. 5. A rounded end 182 on the lever 180 is received within slot 184 of the selector block 172 so that when the bellcrank lever 180 oscillates about its axis, rotary motion is imparted to the selector block 172. Bellcrank lever 180 is pivoted on pivot shaft 186, which is journalled in an opening formed in boss 188 carried by the stationary bracket 166. Bracket 166 is provided with an arm 190 which supports the boss 188 as indicated in FIG. 6. Through the action of the bellcrank 188, rotary adjustment of the shaft 142 is translated into rotary adjustment of the selector block 172 and the shift rail 174.

Figure 7:
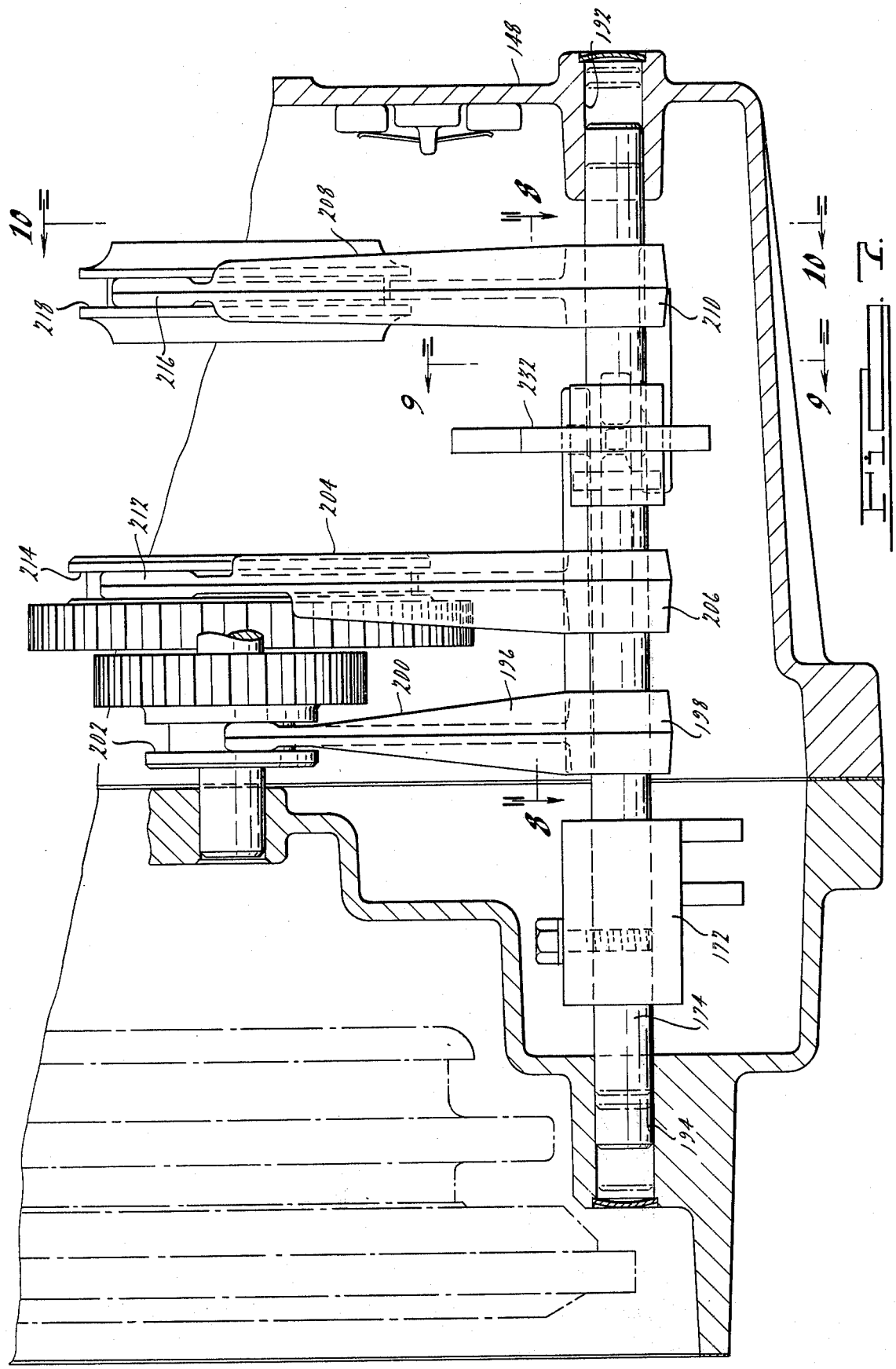
FIG. 7 is a cross sectional view taken along the plane of section line 7—7 of FIG. 2.
Figure 9:
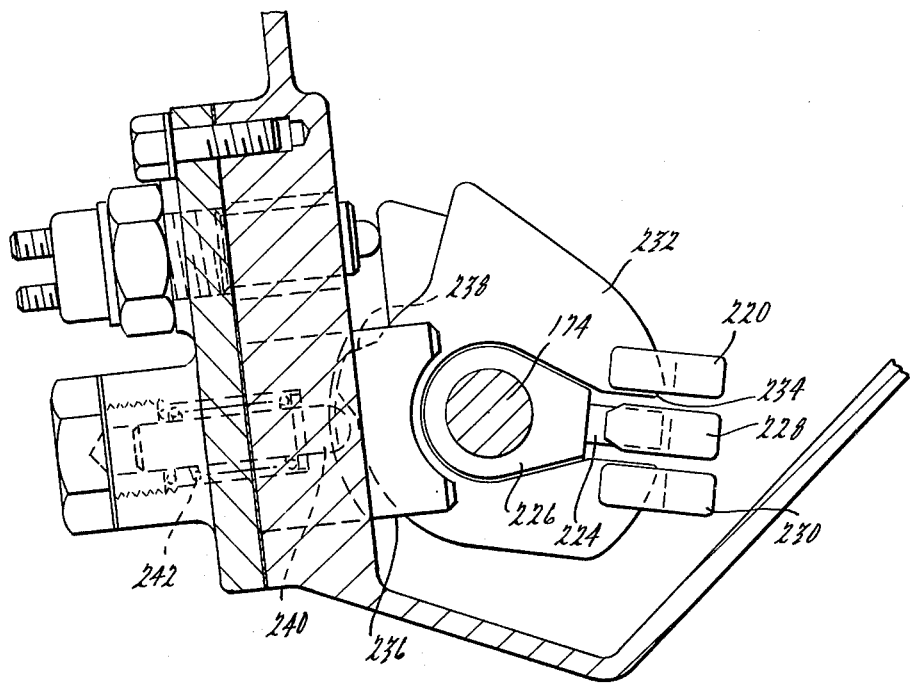
FIG. 9 is a cross sectional view taken along the plane of section line 9—9 of FIG. 7.
Figure 11:
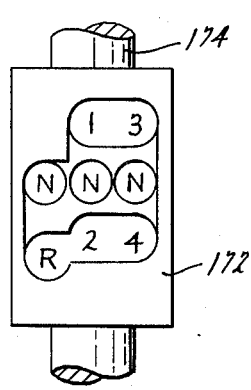
FIG. 11 is a cross sectional view taken along the plane of section line 11—11 of FIG. 4.
Figure 12:
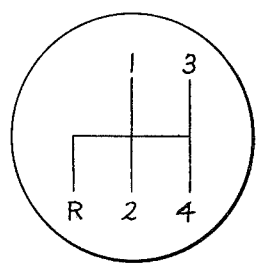
FIG. 12 is a diagram showing the motion pattern of the end of a manually controlled shift lever as the operator selects the various driving ratios for the driveline.
Figure 10:
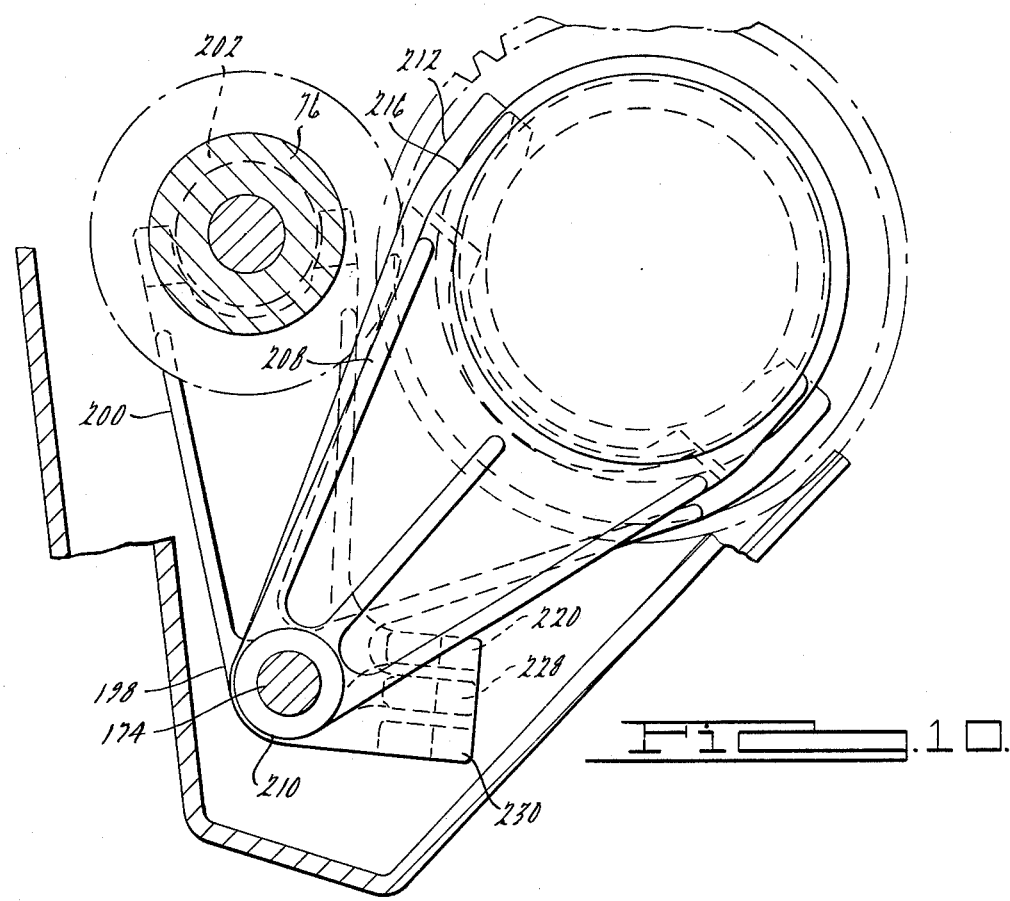
FIG. 10 is a cross sectional view taken along the plane of section line 10—10 of FIG. 7.

As best seen in FIG. 7, the shift rail 174 is end supported by the housing portion 148. The housing portion 148 is formed with openings 192 and 194, which slidably receive the ends of the shift rail 174. A shift fork for the reverse pinion is shown in FIG. 7 at 196. It includes a hub or collar 198 secured to shift rail 174. It includes selector fingers 200 which extend radially outwardly from the shift rail 194 and which are received in annular groove 202 formed in the reverse pinion 76 as indicated in FIG. 3 as well as in FIG. 7. The mechanism that establishes the fixed connection between the collar 198 of the selector fork and the shift rail 174 is shown in FIGS. 9 and 10 and will be described subsequently.

A first and second speed ratio shift fork is shown at 204. It includes a collar 206 slidably received over the shift rail 174. The collar 206 may be locked to the shift rail 174 by the mechanism of FIGS. 8, 9 and 10 as will be described subsequently.

A third and fourth speed ratio shift fork is shown at 208. It also includes a collar 210 formed with an opening through which shift rail 174 slidably extends.

Figure 8:
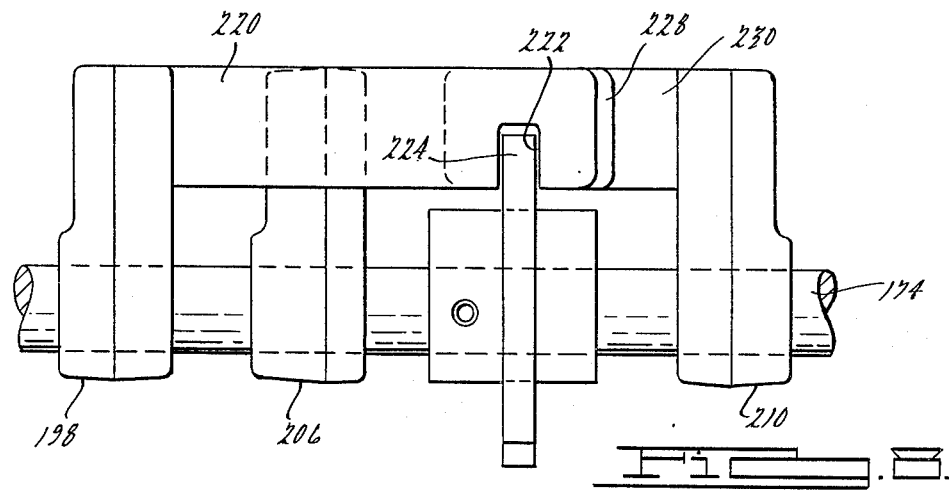
FIG. 8 is a cross sectional view taken along the plane of section line 8—8 of FIG. 7.

The fork 204 includes selector fingers 212 that are received within groove 214 formed in the hub of the first and second speed ratio gear synchronizer clutch sleeve 70. That sleeve, as mentioned earlier, also defines the output reverse drive gear. Shift fork 208 similarly is formed with selector fingers as shown at 216. These are received in annular groove 218 formed in the third and fourth speed ratio torque output gear synchronizer sleeve 96 as indicated in FIG. 7 as well as in FIG. 1. The mechanism of FIGS. 8, 9 and 10 are adapted to lock selectively the forks 200, 204, 208 to the shift rail 174. When they are so locked, axial adjustment of the shift rail will cause axial adjustment of the appropriate synchronizer clutch sleeve in either one direction or the other.

Reverse fork hub 198 is provided with an extension 220, as indicated in FIG. 8. This extension is generally parallel to the axis of the shift rail 174. It is formed at its end with a slot 222 which receives a selector finger 224, as indicated in FIG. 9. Finger 224 is carried by collar 226 which is secured to and held fast on shift rail 174. When shift rail 174 is oscillated, the finger 224 will move into and out of registry with the slot 222. When shift rail 174 is angularly adjusted to establish registry between the finger 224 and the slot 222, axial adjustment of the reverse shift fork may be accomplished.

The first and second speed ratio shift fork hub 206 also is formed with an extension as shown at 228 in FIG. 8. Like the extension 220, extension 228 is formed with a slot that is adapted to receive the shift finger 224 when the shift rail 174 is appropriately adjusted angularly. When the shift finger 224 and the slot in extension 228 are in registry, axial adjustment of the first and second speed ratio shift fork may be accomplished as the selector block 172 is adjusted in either the right-hand direction or a left-hand direction as viewed in FIG. 7.

The third and fourth speed ratio shift fork hub 210 is formed also with an extension as shown at 230. This extension also is formed with a slot that is adapted to receive the shift finger 224 when the shift rail 174 is appropriately adjusted. The relationship between the extensions 220, 228 and 230 is best seen by referring to FIG. 10 where one is shown in stacked relationship with respect to the other.

The collar 226 is received within an interlock plate 232, best seen in FIG. 9. This plate surrounds the shift rail and the collar 226 and rotates with the collar as the latter is adjusted angularly. Plate 232 is formed with a radially extending opening 234 through which the selector finger 224 extends. When the selector finger 224 is in engagement with the first and second speed ratio fork extension 228, the adjacent margins of the plate 232 register with the slotted openings and the other two extensions 220 and 230. This prevents axial movement of shift forks 200 and 208 whenever the shift rail 204 is conditioned for shifting movement between the first speed ratio position and the second speed ratio position. Thus, adjustment of the first and second speed ratio shift fork can be accomplished to the exclusion of the others. The plate 232 is held fast against axial movement by stationary boss 236 located on either side thereof. The collar 226 may be adjusted axially with respect to the plate 232 although relative rotation therebetween is prevented.

When the selector finger 224 is in engagement with extension 220, plate 232 registers with the slots in the extensions 228 and 230 thereby allowing adjustment of the reverse shift fork while preventing adjustment of the first and second speed ratio shift fork and the third and fourth speed ratio shift fork. Similarly, when the selector finger 224 is adjusted in a clockwise direction as viewed in FIG. 9 so that it engages the extension 230, the interlock plate 232 will enter the slots in the two extensions 220 and 228 thereby preventing adjustment of the shift forks 200 and 204 during adjusting movements of the shift fork 208.

The interlock plate 232 may be provided with a cam portion 238 which registers with detent 240. This detent is spring loaded into camming engagement with the margin of the plate 232 by detent spring 42. This provides a resistance to movement of the shift rail to the reverse speed ratio position. This resistance must be overcome by the operator in order to engage the reverse gear. This avoids inadvertent shifting movement of the transmission mechanism into reverse gear when reverse drive is desired.

In order to effectively separate the various speed ratio positions of the shift rail I have provided, as indicated in FIG. 4, a spring loaded detent that comprises detent recesses 244 and 246 and 248. The spring loaded detent plunger 250 engages the detent recesses, each of which is formed in the selector block 172.

What I claim and desire to secure by U.S. Letters Patent is:

1. A multiple speed ratio power transmission mechanism for an automotive vehicle comprising a power input shaft adapted to be clutched to an internal combustion engine, gearing defining multiple torque delivery paths including multiple pairs of gears carried by said input shaft and by said countershaft, synchronizer clutch means associated with one gear of each pair for connecting said one gear to its associated shaft, one pair of said gears meshing with a reverse drive pinion which establishes a geared connection therebetween, said pinion being shiftable into and out of engagement with said last mentioned pair of gears, a differential mechanism, torque output gearing connecting said differential mechanism with said countershaft whereby torque is delivered from said gearing to torque output parts of said differential mechanism, a shift rail mounted in parallel disposition with respect to said input shaft and said countershaft, shift forks carried by said shift rail, one of said shift forks being engageable with said reverse pinion and the other shift forks being engageable with said synchronizer clutch means, said shift forks being mounted slidably on said shift rail, lever means including first and second bellcrank levers for effecting rotary and axial shifting movement of said shift rail, interlock clutch means including drive portions connected to said shift rail and driven portions connected to each of said shift forks whereby said shift forks may be adjusted axially upon axial movement of said shift rail, the driving portions of said interlock clutch means moving into registry with selected ones of said driven portions of said interlock clutch means by rotary adjustment of said shift rail, said linkage mechanism for effecting rotary and axial shifting movement of said shift rail comprising a shift selector shaft mounted on a relatively stationary portion of said mechanism in transverse disposition with respect to said shift rail, said shift selector shaft being adapted for rotary and axial movement, said first bellcrank lever being pivoted on a stationary portion of said mechanism with its operating ends engaged respectively with said shift selector shaft and said shift rail whereby axial movement of said shift lever is translated into axial movement of said rail, said second bellcrank lever being mounted on a stationary portion of said mechanism with one of its operating ends connected to said shift rail and the other connected to said shift selector shaft whereby rotary motion of said shift selector shaft is translated into rotary motion of said shift rail.

2. A multiple speed ratio power transmission mechanism for an automotive vehicle comprising a power input shaft adapted to be clutched to an internal combustion engine, gearing defining multiple torque delivery paths including multiple pairs of gears carried by said input shaft and by said countershaft, synchronizer clutch means associated with one gear of each pair for connecting said one gear to its associated shaft, one pair of said gears meshing with a reverse drive pinion which establishes a geared connection therebetween, said pinion being shiftable into and out of engagement with said last mentioned pair of gears, a differential mechanism, torque output gearing connecting said differential mechanism with said countershaft whereby torque is delivered from said gearing to torque output parts of said differential mechanism, a shift rail mounted in parallel disposition with respect to said input shaft and said countershaft, shift forks carried by said shift rail, one of said shift forks being engageable with said reverse pinion and the other shift forks being engageable with said synchronizer clutch means, said shift forks being mounted slidably on said shift rail, lever means including first and second bellcrank levers for effecting rotary and axial shifting movement of said shift rail, interlock clutch means including drive portions connected to said shift rail and driven portions connected to each of said shift forks whereby said shift forks may be adjusted axially upon axial movement of said shift rail, the driving portions of said interlock clutch means moving into registry with selected ones of said driven portions of said interlock clutch means by rotary adjustment of said shift rail, said interlock clutch means comprising overlapping extensions carried by said shift forks and a selector finger carried by said shift rail, said selector finger engaging individual ones of said extensions upon rotary adjustment of said shift rail, and an interlock plate adjacent said shift finger whereby said plate engages the extensions for at least two of said shift rails as an adjacent shift rail extension is engaged by said shift finger, said linkage mechanism for effecting rotary and axial shifting movement of said shift rail comprises a shift selector shaft mounted on a relatively stationary portion of said mechanism in transverse disposition with respect to said shift rail, said shift selector shaft being adapted for rotary and axial movement, said first bellcrank lever being pivoted on a stationary portion of said mechanism with its operating ends engaged respectively with said shift selector shaft and said shift rail whereby axial movement of said shift lever is translated into axial movement of said rail, said second bellcrank lever being mounted on a stationary portion of said mechanism with one of its operating ends connected to said shift rail and the other connected to said shift selector shaft whereby rotary motion of said shift selector shaft is translated into rotary motion of said shift rail.

* * * * *